US012258928B2

(12) United States Patent
Ogawa

(10) Patent No.: US 12,258,928 B2
(45) Date of Patent: Mar. 25, 2025

(54) FUEL INJECTOR, AND METHOD FOR DRIVING FUEL INJECTOR

(71) Applicant: MITSUBISHI HEAVY INDUSTRIES ENGINE & TURBOCHARGER, LTD., Sagamihara (JP)

(72) Inventor: Hisao Ogawa, Kanagawa (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/570,843

(22) PCT Filed: Jun. 22, 2022

(86) PCT No.: PCT/JP2022/024918
§ 371 (c)(1),
(2) Date: Dec. 15, 2023

(87) PCT Pub. No.: WO2023/007999
PCT Pub. Date: Feb. 2, 2023

(65) Prior Publication Data

US 2024/0295204 A1 Sep. 5, 2024

(30) Foreign Application Priority Data

Jul. 27, 2021 (JP) ................................ 2021-122450

(51) Int. Cl.
*F02M 47/02* (2006.01)
*F02D 41/20* (2006.01)

(52) U.S. Cl.
CPC ........... *F02M 47/027* (2013.01); *F02D 41/20* (2013.01); *F02D 2041/2017* (2013.01); *F02D 2200/0602* (2013.01)

(58) Field of Classification Search
CPC .................. F02M 47/027; F02D 41/20; F02D 2041/2017; F02D 2200/0602
See application file for complete search history.

(56) References Cited

U.S. PATENT DOCUMENTS 6,234,150 B1 * 5/2001 Watanabe ............... F02D 41/40 123/490
8,857,789 B2 10/2014 Ogawa et al.
(Continued)

FOREIGN PATENT DOCUMENTS

DE 102 30 267 A1 1/2004
DE 10 2008 002 019 A1 12/2009
(Continued)

OTHER PUBLICATIONS

International Search Report and Written Opinion of the International Searching Authority for International Application No. PCT/JP2022/024918, dated Sep. 13, 2022, with English translation.
Extended European Search Report for European Application No. 22849074.4, dated Aug. 2, 2024.

*Primary Examiner* — Jacob M Amick
*Assistant Examiner* — Charles J Brauch
(74) *Attorney, Agent, or Firm* — Birch, Stewart, Kolasch & Birch, LLP

(57) ABSTRACT

This fuel injector comprises: a main body portion including an inflow port into which fuel supplied from a fuel supply source flows, a flow passage through which the fuel that has flowed in from the inflow port flows, and a discharge port which is connected to the flow passage and which discharges the fuel; a valve unit at least a portion of which is formed using a magnetic body, which is disposed so as to be capable of moving in a straight-line direction between a position closing the discharge port and a position opening the discharge port, which is urged in the direction opening the discharge port by means of the pressure of the fuel flowing in from the inflow port, and to which an elastic force is
(Continued)

imparted by an elastic member in the direction closing the discharge port; a solenoid device which includes a coil, which generates an electromagnetic force by causing a drive current to flow through the coil, and which drives the valve unit in the direction opening the discharge port, by means of the electromagnetic force; and a control portion which variably sets the value of a prescribed time period that includes a drive current supply start time point, of the drive current flowing through the coil, in accordance with a supply pressure of the fuel supplied to the inflow port.

8 Claims, 7 Drawing Sheets

(56) References Cited

U.S. PATENT DOCUMENTS

| | | | |
|---|---|---|---|
| 2007/0028895 | A1 | 2/2007 | Fujii |
| 2017/0122245 | A1 | 5/2017 | Takeuchi |
| 2021/0079878 | A1 | 3/2021 | Yanoto |

FOREIGN PATENT DOCUMENTS

| | | | | | |
|---|---|---|---|---|---|
| JP | 2003278586 | A | * | 10/2003 | ............ F02D 41/20 |
| JP | 2006-200478 | A | | 8/2006 | |
| JP | 2008-25345 | A | | 2/2008 | |
| JP | 2010-101349 | A | | 5/2010 | |
| JP | 2011-99358 | A | | 5/2011 | |

* cited by examiner

| SUPPLY PRESSURE | DRIVE CURRENT |
|---|---|
| SUPPLY PRESSURE 1 | DRIVE CURRENT 1 |
| SUPPLY PRESSURE 2 | DRIVE CURRENT 2 |
| SUPPLY PRESSURE 3 | DRIVE CURRENT 3 |
| ⋮ | ⋮ |

FUEL INJECTOR, AND METHOD FOR DRIVING FUEL INJECTOR

TECHNICAL FIELD

The present disclosure relates to a fuel injector and a method for driving the fuel injector.

BACKGROUND ART

A common rail type fuel injection device that is applied to a diesel engine or the like includes a fuel pump, a common rail, and a fuel injector. The fuel pump sucks fuel from a fuel tank, pressurizes the fuel, and supplies the fuel to the common rail as high-pressure fuel. The common rail maintains the high-pressure fuel supplied from the fuel pump at a predetermined pressure. The fuel injector injects the high-pressure fuel in the common rail into a combustion chamber of the diesel engine by opening and closing an injection valve.

The fuel injector has, for example, an electromagnetic valve that includes a solenoid device that generates an electromagnetic force by causing a current to flow through a coil wound around a core and a valve unit that is formed using a magnetic body. In such an electromagnetic valve, for example, a configuration in which a fuel flow path is held down by causing an elastic force to act on the valve unit is made, and in a case where an electromagnetic force is not generated by the solenoid device, the fuel flow path is in a held down and closed state due to the elastic force. Further, in a case where the electromagnetic generated by the solenoid device, the valve unit is pulled toward the core side of the solenoid device due to the electromagnetic force, so that the valve unit is separated from the flow path to open the flow path (refer to, for example, PTL 1 and the like).

CITATION LIST

Patent Literature

[PTL 1] Japanese Unexamined Patent Application Publication No. 2010-101349

SUMMARY OF INVENTION

Technical Problem

In the electromagnetic valve as described above, in order to generate a large electromagnetic force, it is necessary to make a drive current flowing through the coil high. In a case where a drive current having a high value flows through the coil, the amount of heat generated in the coil increases, and a thermal load in a solenoid increases. Therefore, in the solenoid device that needs to generate a large electromagnetic force, it is necessary to separately provide a cooling mechanism that cools the coil.

The present disclosure has been made in view of the above, and has an object to provide a fuel injector and a method for driving the fuel injector, in which it is possible to suppress the amount of heat generated.

Solution to Problem

A fuel injector according to the present disclosure includes: a main body part having an inflow port into which fuel that is supplied from a fuel supply source flows, a flow path through which the fuel that has flowed in from the inflow port flows, and a discharge port that is connected to the flow path and discharges the fuel; a valve unit, at least a part of which is formed using a magnetic body, and which is disposed to be movable in a straight line direction between a position where the discharge port is closed and a position where the discharge port is opened, and is biased in a direction to open the discharge port by pressure of the fuel flowing in from the inflow port, the valve unit being applied with an elastic force in a direction to close the discharge port by an elastic member; a solenoid device that includes a coil, generates an electromagnetic force by causing a drive current to flow through the coil, and drives the valve unit in the direction to open the discharge port by the electromagnetic force; and a control unit that variably sets a value of the drive current flowing through the coil in a predetermined period that includes a drive current supply start time point, depending on a supply pressure of the fuel that is supplied to the inflow port.

A method for driving a fuel injector according to the present disclosure is a method for driving a fuel injector which includes a main body part having an inflow port into which fuel that is supplied from a fuel supply source flows, a flow path through which the fuel that has flowed in from the inflow port flows, and a discharge port that is connected to the flow path and discharges the fuel, a valve unit, at least a part of which is formed using a magnetic body, and which is disposed to be movable in a straight line direction between a position where the discharge port is closed and a position where discharge port is opened, and is biased in a direction to open the discharge port by pressure of the fuel flowing in from the inflow port, the valve unit being applied with an elastic force in a direction to close the discharge port by an elastic member, and a solenoid device that includes a coil, generates an electromagnetic force by causing a drive current to flow through the coil, and drives the valve unit in the direction to open the discharge port by the electromagnetic force, the method including: a step of acquiring a supply pressure of the fuel that is supplied to the inflow port; and a step of setting a value of the drive current flowing through the coil in a predetermined period that includes a drive current supply start time point, based on the supply pressure.

Advantageous Effects of Invention

According to the present disclosure, it is possible to provide a fuel injector and a method for driving the fuel injector, in which it is possible to suppress the amount of heat generated.

DESCRIPTION OF EMBODIMENTS

Hereinafter, an embodiment of a solenoid device and an electromagnetic valve of a fuel injection device according to the present disclosure will be described based on the drawings. The present invention is not limited to the embodiment. Further, components in the following embodiment include components that can be easily replaced by those skilled in the art, or components that are substantially the same.

Figure 1:
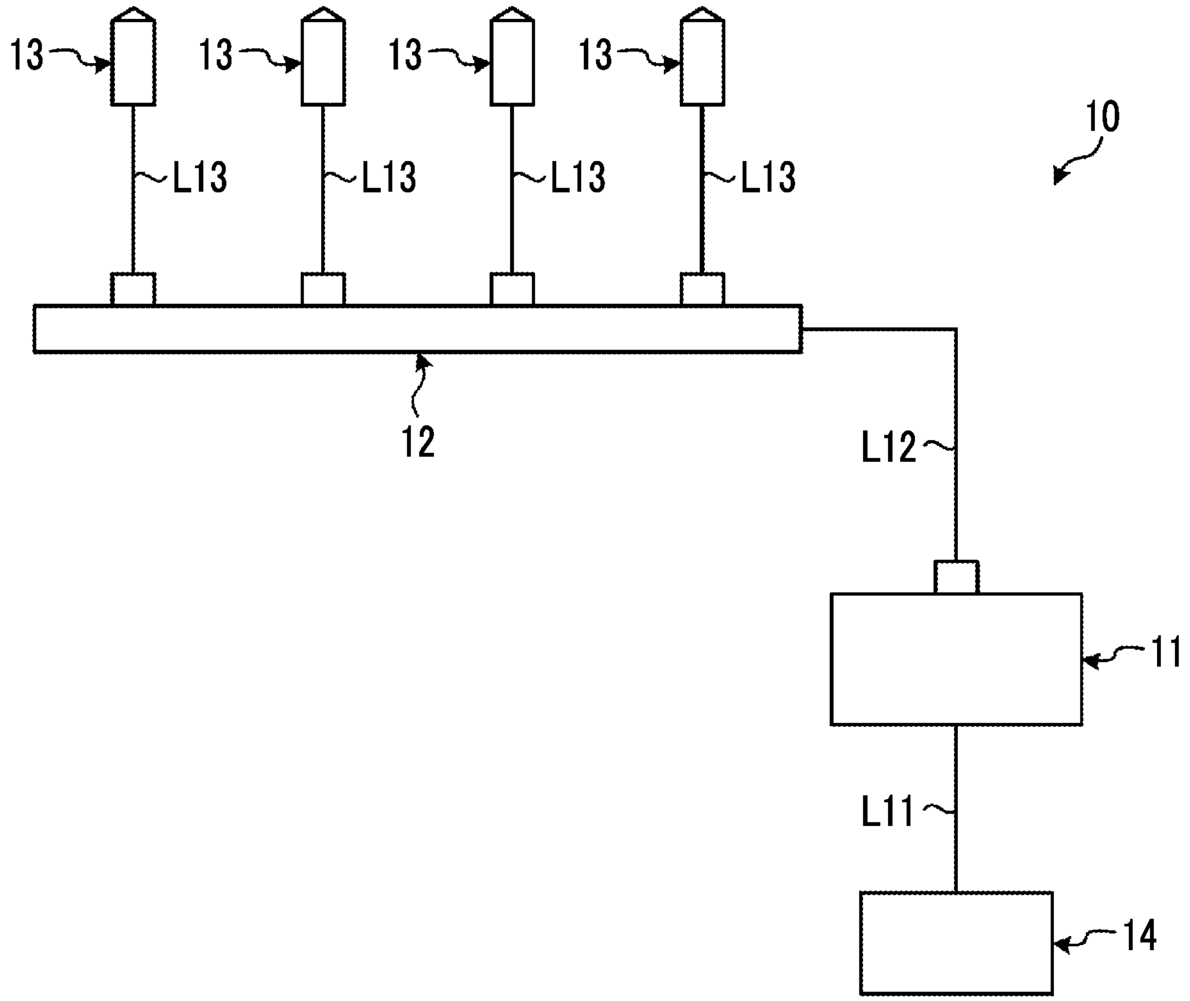
FIG. 1 is a schematic configuration diagram showing an example of a fuel injection device of the present embodiment.

FIG. 1 is a schematic configuration diagram showing an example of a fuel injection device 10 of the present embodiment. As shown in FIG. 1, the fuel injection device 10 is installed in a diesel engine (internal combustion engine). The fuel injection device 10 includes a fuel pump 11, a common rail 12, and a plurality of fuel injectors 13.

The fuel pump 11 is connected to a fuel tank 14 through a fuel line L11. The fuel pump 11 sucks fuel stored in the fuel tank 14 from the fuel line L11 and pressurizes the fuel to generate high-pressure fuel. The fuel pump 11 is connected to the common rail 12 through a fuel high-pressure line L12. In the present embodiment, the fuel pump 11 is a fuel supply source from which fuel is supplied. The common rail 12 maintains the high-pressure fuel supplied from the fuel pump 11 at a predetermined pressure. The common rail 12 is connected to each of the fuel injectors 13 through each of a plurality of (in the present embodiment, four) fuel supply lines L13. The fuel injector 13 injects the high-pressure fuel in the common rail 12 into each cylinder (combustion chamber) of the diesel engine by opening and closing an electromagnetic valve.

Figure 2:
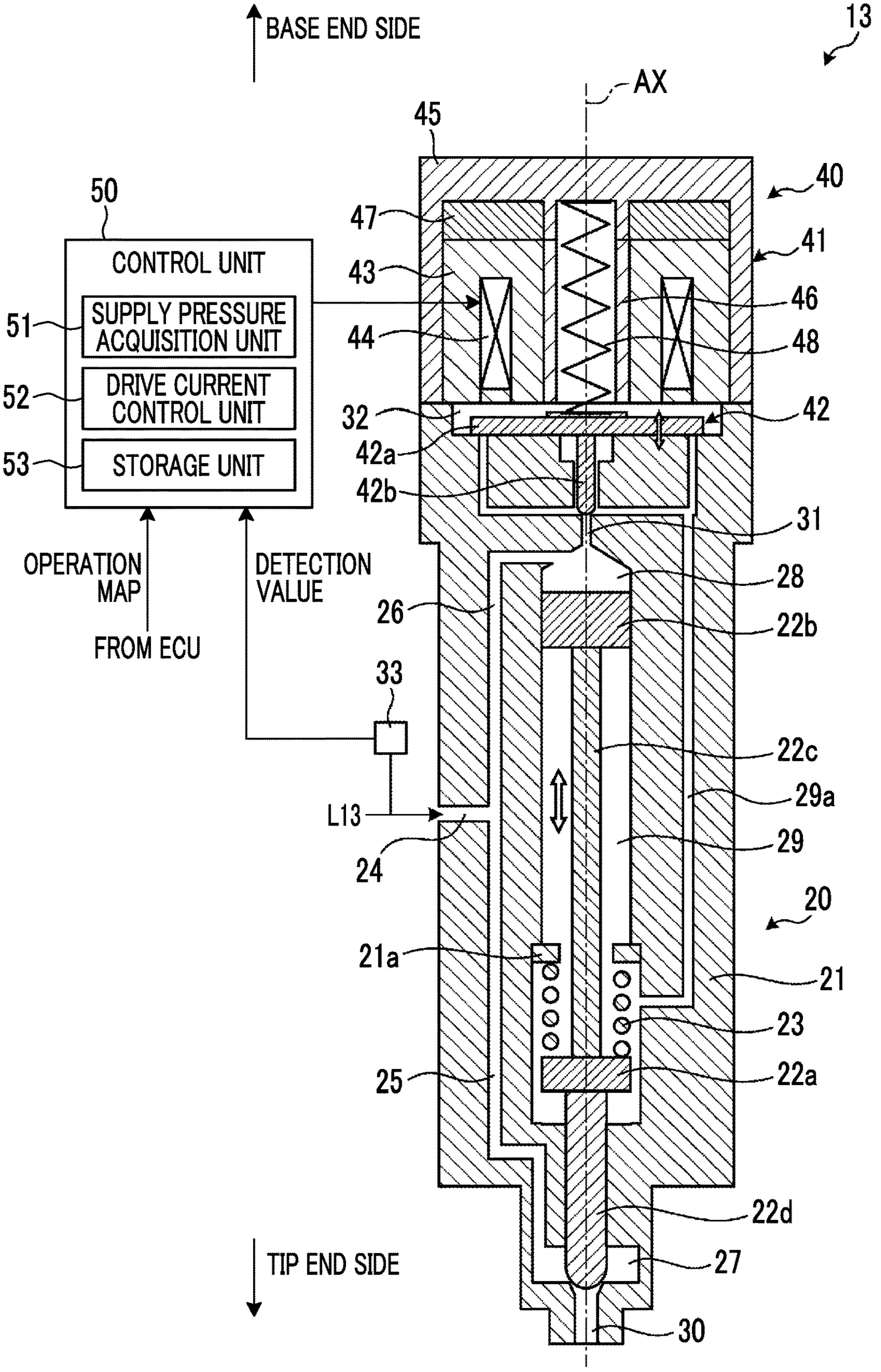
FIG. 2 is a vertical sectional view showing an example of a fuel injector.

FIG. 2 is a vertical sectional view showing an example of the fuel injector 13. As shown in FIG. 2, the fuel injector 13 has a shape extending in an axial direction of a central axis AX, and has a main body part 20, an electromagnetic valve 40, and a control unit 50. Hereinafter, in describing the configuration of the fuel injector 13, a fuel injection port 30 side in the axial direction of the central axis AX is referred to as a tip end side, and an electromagnetic valve 40 side is referred to as a base end side.

The main body part 20 has a casing 21 and a piston valve 22. The casing 21 has a fuel inlet port 24, an injection-side flow path 25, a control-side flow path 26, an injection-side pressure chamber 27, a control-side pressure chamber 28, a cylinder chamber 29, the fuel injection port 30, a fuel discharge port 31, an electromagnetic valve-side pressure chamber 32, and a sensor 33.

The fuel from the fuel supply line L13 flows into the fuel inlet port 24. The injection-side flow path 25 connects the fuel inlet port 24 and the injection-side pressure chamber 27. The control-side flow path 26 connects the fuel inlet port 24 and the control-side pressure chamber 28.

The injection-side pressure chamber 27 is connected to the fuel injection port 30. The fuel injection port 30 is disposed at an end portion on the tip end side of the casing 21 and injects the fuel toward each cylinder of the diesel engine.

The control-side pressure chamber 28 is connected to the fuel discharge port 31. The fuel discharge port 31 is disposed at an end portion on the base end side of the casing 21 and connected to the electromagnetic valve-side pressure chamber 32. The electromagnetic valve-side pressure chamber 32 is connected to the electromagnetic valve 40 (a space portion 46*d* to be described later).

The cylinder chamber 29 is connected to the injection-side pressure chamber 27 and the control-side pressure chamber 28. The cylinder chamber 29 accommodates the piston valve 22. The cylinder chamber 29 is connected to the electromagnetic valve-side pressure chamber 32 through a flow path 29*a*.

The piston valve 22 is accommodated in the cylinder chamber 29 and is provided to be movable toward the injection-side pressure chamber 27 side or the control-side pressure chamber 28 side. The piston valve 22 has a spring seat member 22*a*, a control-side piston member 22*b*, a connecting member 22*c*, and a valve body 22*d*. The spring seat member 22*a*, the control-side piston member 22*b*, and the connecting member 22*c* are integrated. The spring seat member 22*a* receives the elastic force of an elastic member 23 (described later). The control-side piston member 22*b* receives the pressure in the control-side pressure chamber 28. The connecting member 22*c* connects the spring seat member 22*a* and the control-side piston member 22*b*. The valve body 22*d* protrudes from the spring seat member 22*a* toward the tip end side in the axial direction of the central axis AX. The valve body 22*d* comes into contact with the spring seat member 22*a* due to the resultant force of the pressure received from each pressure chamber and the elastic force. The valve body 22*d* is formed in such a shape that its tip portion can close the fuel injection port 30. The valve body 22*d* receives the pressure in the injection-side pressure chamber 27.

In a case where the pressure in the injection-side pressure chamber 27 is smaller than the resultant force of the pressure in the control-side pressure chamber 28 and the elastic force of the elastic member 23, the piston valve 22 becomes a state of being pressed toward the injection-side pressure chamber 27 side. In this case, the fuel injection port 30 becomes a closed state by the valve body 22*d*. In this state, in a case where the pressure in the injection-side pressure chamber 27 becomes larger than the resultant force of the pressure in the control-side pressure chamber 28 and the elastic force of the elastic member 23, the piston valve 22 becomes a state of being pressed toward the control-side pressure chamber 28 side. In this case, the valve body 22*d* is separated from the fuel injection port 30 and the fuel injection port 30 becomes an open state.

The sensor 33 detects supply pressure which is the pressure of the fuel that is supplied to the fuel inlet port 24. The sensor 33 may be configured to detect, for example, the pressure in the common rail 12 (rail pressure) as the supply pressure. The sensor 33 transmits the supply pressure, which is a detection result, to the control unit 50.

Figure 3:
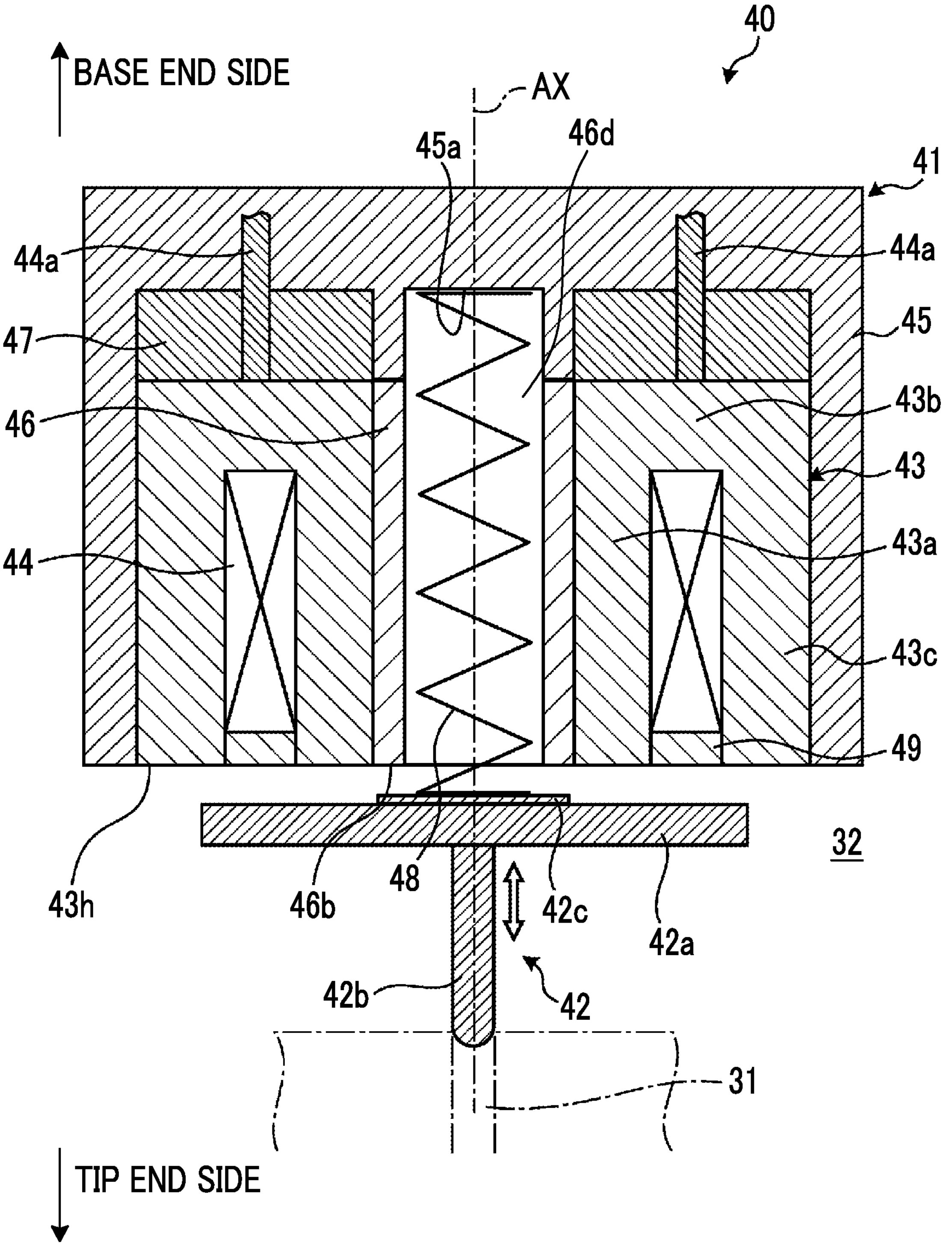
FIG. 3 is a vertical sectional view showing an example of an electromagnetic valve.

The electromagnetic valve 40 has a solenoid device 41 and a valve unit 42. FIG. 3 is a vertical sectional view showing an example of the electromagnetic valve 40. FIG. 3 shows a part of FIG. 2 in an enlarged manner. As shown in FIG. 3, the solenoid device 41 drives the valve unit 42 along the axial direction of the central axis AX by an electromagnetic force. The solenoid device 41 has a core 43, a coil 44, a casing 45, a tubular member 46, and a terminal fixing member 47.

The core 43 has a tubular portion 43*a*, a flange portion 43*b*, and a side surface portion 43*c*. The tubular portion 43*a* is formed, for example, in a cylindrical shape. The flange portion 43*b* has, for example, a disk shape and is disposed on the base end side of the core 43. The tubular portion 43*a* and the flange portion 43*b* are disposed such that their central axes coincide with the central axis AX of the fuel injector 13.

The side surface portion 43$c$ has a cylindrical shape that involves the tubular portion 43$a$. The side surface portion 43$c$ is disposed to be spaced apart from the tubular portion 43$a$ in a radial direction, and extends toward the tip end side. The tubular portion 43$a$, the flange portion 43$b$, and the side surface portion 43$c$ are formed using a magnetic body. The core 43 accommodates the coil 44 in a space surrounded by the tubular portion 43$a$, the flange portion 43$b$, and the side surface portion 43$c$. In the core 43, the space in which the coil 44 is disposed is sealed by a sealing part 49. The sealing part 49 is formed using, for example, a resin material. Further, the terminal fixing member 47 is disposed between the core 43 and the casing 45 (described later) in the axial direction of the central axis AX, and fixes a terminal 44$a$ that is connected to the coil 44. The terminal 44$a$ penetrates the casing 45 and is drawn out to the outside. The terminal fixing member 47 is formed using, for example, a resin material.

The coil 44 is disposed in a state of being wound around the tubular portion 43$a$. The coil 44 penetrates the casing 45 (described later) and is connected to a power source part (not shown). The solenoid device 41 generates an electromagnetic force by causing a current to flow through the coil 44.

The casing 45 accommodates the core 43 and the coil 44. The casing 45 is formed using, for example, a resin material. The casing 45 has a supporting part 45$a$ that supports an elastic member 48 (described later).

The tubular member 46 is disposed on the inner periphery side of the core 43. The tubular member 46 is formed using, for example, a metal material. The tubular member 46 may be metal of a non-magnetic body. The tubular member 46 has, for example, a cylindrical shape and is disposed such that its central axis coincides with the central axis AX of the fuel injector 13. The tubular member 46 is disposed at a position where an end surface 46$b$ on the tip end side can come into contact with the valve unit 42. In the present embodiment, the end surface 46$b$ is flush with, for example, an end surface on the tip end side of the side surface portion 43$c$ of the core 43 and an end surface on the tip end side of the sealing part 49.

The elastic member 48 is accommodated on the inner periphery side of the tubular member 46 in a state where its end portion on the base end side is supported by the supporting part 45$a$ of the casing 45. The elastic member 48 applies an elastic force to the valve unit 42 toward the tip end side in the axial direction of the central axis AX.

The valve unit 42 moves in the axial direction of the central axis AX due to the electromagnetic force generated by the solenoid device 41. The valve unit 42 has an armature 42$a$, a valve body 42$b$, and a stepped portion 42$c$. The armature 42$a$ is formed using a magnetic body. The armature 42$a$ has, for example, a disk shape. The armature 42$a$ is disposed to face an end portion on the tip end side of the core 43 of the solenoid device 41. The valve body 42$b$ extends from the armature 42$a$ toward the tip end side. The valve body 42$b$ is formed in such a shape that its tip portion can close the fuel discharge port 31. The valve body 42$b$ may be formed of a magnetic body or may be formed of a non-magnetic body. The stepped portion 42$c$ is formed in a state where the central portion of the armature 42$a$ protrudes toward the solenoid device 41 side. The stepped portion 42$c$ is formed in a shape and a dimension in which it comes into contact with the end surface 46$b$ of the tubular member 46 when the valve unit 42 is drawn toward the solenoid device 41 side. Further, the stepped portion 42$c$ receives an elastic force from the elastic member 48. The elastic force of the elastic member 48 is transmitted to the armature 42$a$ and the valve body 42$b$ through the stepped portion 42$c$. The elastic force of the elastic member 48 is applied to the armature 42$a$ and the valve body 42$b$ toward the tip end side in the axial direction of the central axis AX.

The control unit 50 controls the operation of the solenoid device 41. The control unit 50 has a processing device such as a central processing unit (CPU), and a storage device such as a random access memory (RAM) or a read only memory (ROM). The control unit 50 includes a supply pressure acquisition unit 51, a drive current control unit 52, and a storage unit 53.

The supply pressure acquisition unit 51 acquires the supply pressure of the fuel that is supplied to the fuel inlet port 24. The supply pressure acquisition unit 51 can acquire the detection result of the sensor 33 as the supply pressure. Further, the supply pressure acquisition unit 51 may be capable of acquiring an operation map indicating the operation content of the fuel injection device 10 from an electronic control unit (ECU) (not shown) that controls the fuel injection device 10. In this case, the supply pressure acquisition unit 51 may be configured to extract the supply pressure, based on the acquired operation map, and acquire the extracted supply pressure.

Figure 4:
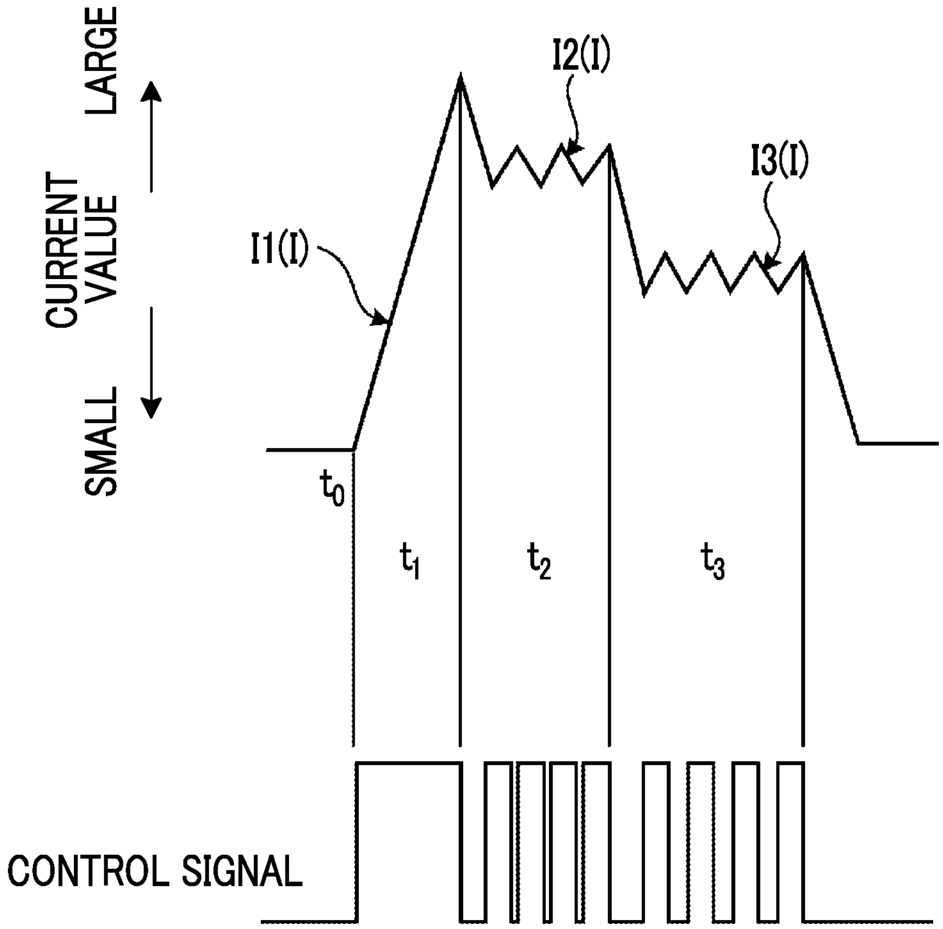
FIG. 4 is a diagram showing an example of a profile of a drive current that is supplied to a coil.

The drive current control unit 52 controls a drive current that is supplied to the coil 44 of the solenoid device 41 according to the supply pressure acquired by the supply pressure acquisition unit 51. FIG. 4 is a diagram showing an example of a profile of the drive current that is supplied to the coil 44. As shown in FIG. 4, a drive current I includes an inrush current I1, a pull-up current I2, and a hold current I3.

The inrush current I1 flows through the coil 44 during an inrush period t1, which is the first period that includes a supply start time point to in a time series. For example, as shown in FIG. 4, the inrush current I1 is generated by a pulse signal whose period extends over the entire inrush period t1, as a control signal. The inrush current I1 serves as a drive current for generating an electromagnetic force that separates the valve unit 42 closing the fuel discharge port 31.

The pull-up current I2 flows through the coil 44 after the inrush current I1 has flowed, that is, during a pull-up period t2 after the inrush period t1 has elapsed. The pull-up current I2 has a lower peak current value than the inrush current I1. The pull-up current I2 serves as a drive current for generating an electromagnetic force that pulls the valve unit 42 separated from the fuel discharge port 31 toward the core 43 side. The pull-up current I2 is generated by a plurality of pulse signals as a control signal.

The hold current I3 flows through the coil 44 after the pull-up current I2 has flowed, that is, during a hold period t3 after the pull-up period t2 has elapsed. The hold current I3 is generated by a plurality of pulse signals as a control signal. The hold current I3 serves as a drive current for generating an electromagnetic force that holds the valve unit 42 pulled toward the core 43 side. The hold current I3 has a lower peak current value than the inrush current I1 and the pull-up current I2.

The drive current control unit 52 variably sets the value of the drive current I in a predetermined period that includes the supply start time point to, depending on the acquired supply pressure. The drive current control unit 52 makes the value of the drive current I in the predetermined period smaller as the acquired supply pressure is higher, and makes the value of the drive current I in the predetermined period larger as the acquired supply pressure is lower.

Figures 5, 6:
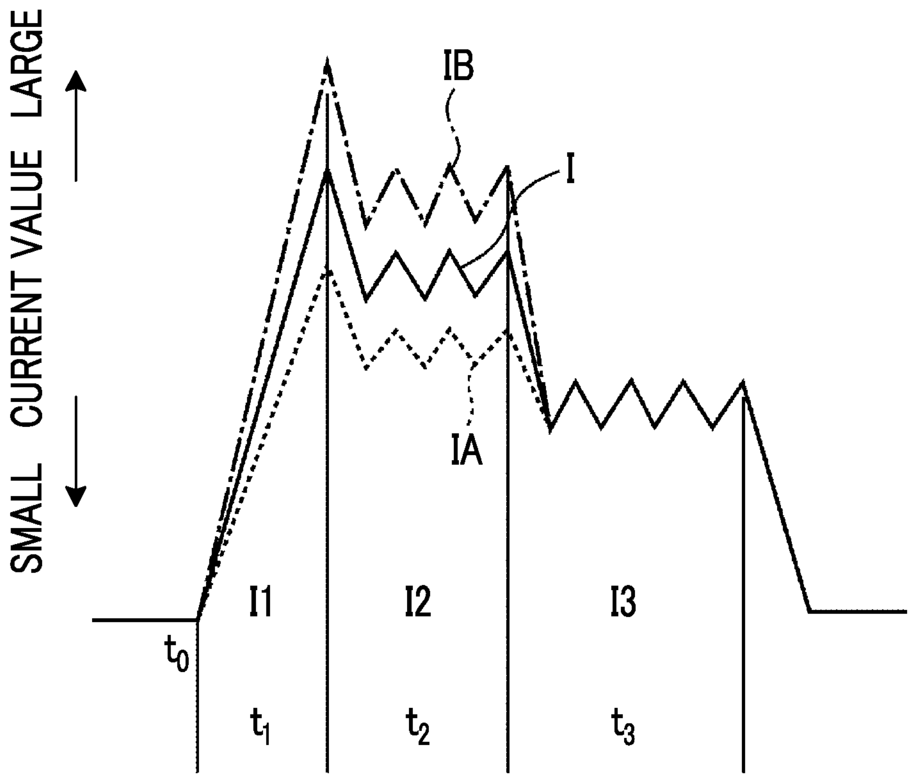
FIG. 5 is a diagram showing an example of the drive current that is controlled by a drive current control unit.
FIG. 6 is a diagram showing an example of a data table that is stored in a storage unit.

FIG. 5 is a diagram showing an example of the drive current that is controlled by the drive current control unit 52. As shown in FIG. 5, the drive current control unit 52 can variably set the values of the drive current I, for example, in the inrush period t1 and the pull-up period t2 as the predetermined period that includes the supply start time point to. As shown in FIG. 5, the drive current control unit 52 can make the values of the inrush current I1 in the inrush period t1 and the pull-up current I2 in the pull-up period t2 smaller as the acquired supply pressure is higher (a drive current IA). Further, the drive current control unit 52 can make the values of the inrush current I1 in the inrush period t1 and the pull-up current I2 in the pull-up period t2 larger as the acquired supply pressure is lower (a drive current IB). The values of the drive currents I, IA, and IB can be set such that the valve unit 42 can be pulled toward the core 43 side by the generated electromagnetic force. That is, the values of the drive currents I, IA, and IB can be set such that the force acting on the valve unit 42 toward the base end side (the elastic force from the elastic member 48, or the electromagnetic force that is generated by the solenoid device 41) becomes larger than the force acting on the valve unit 42 toward the tip end side (the pressure received from the control-side pressure chamber 28). The drive current control unit 52 is not limited to the configuration that controls the inrush current I1 and the pull-up current I2 in three stages as shown in FIG. 5, and may be configured to control the inrush current I1 and the pull-up current I2 in two stages or four or more stages.

The storage unit 53 stores various types of information. The storage unit 53 has a storage such as a hard disk drive or a solid state drive, for example. As the storage unit 53, an external storage medium such as a removable disk may be used. In the present embodiment, the storage unit 53 stores a data table that defines the correspondence relationship between the acquired supply pressure and the drive current I. FIG. 6 is a diagram showing an example of the data table that is stored in the storage unit 53. As shown in FIG. 6, the storage unit 53 stores the data table in which the value of the drive current is associated with each supply pressure. The drive current control unit 52 described above can set the value of the drive current corresponding to the supply pressure, based on the data table stored in the storage unit 53.

The operation of the fuel injector 13 configured as described above will be described. In a case where a current does not flow through the coil 44 of the solenoid device 41, an electromagnetic force is not generated in the solenoid device 41. In this case, in the valve unit 42, the valve body 42*b* presses the fuel discharge port 31 toward the tip end side due to the elastic force of the elastic member 48. In this way, the fuel discharge port 31 becomes a closed state.

In a state where the fuel discharge port 31 is closed, the resultant force of the pressure in the control-side pressure chamber 28 and the elastic force of the elastic member 23 becomes larger than the pressure in the injection-side pressure chamber 27. Therefore, the piston valve 22 presses the fuel injection port 30 and the fuel injection port 30 becomes a closed state.

Figure 7:
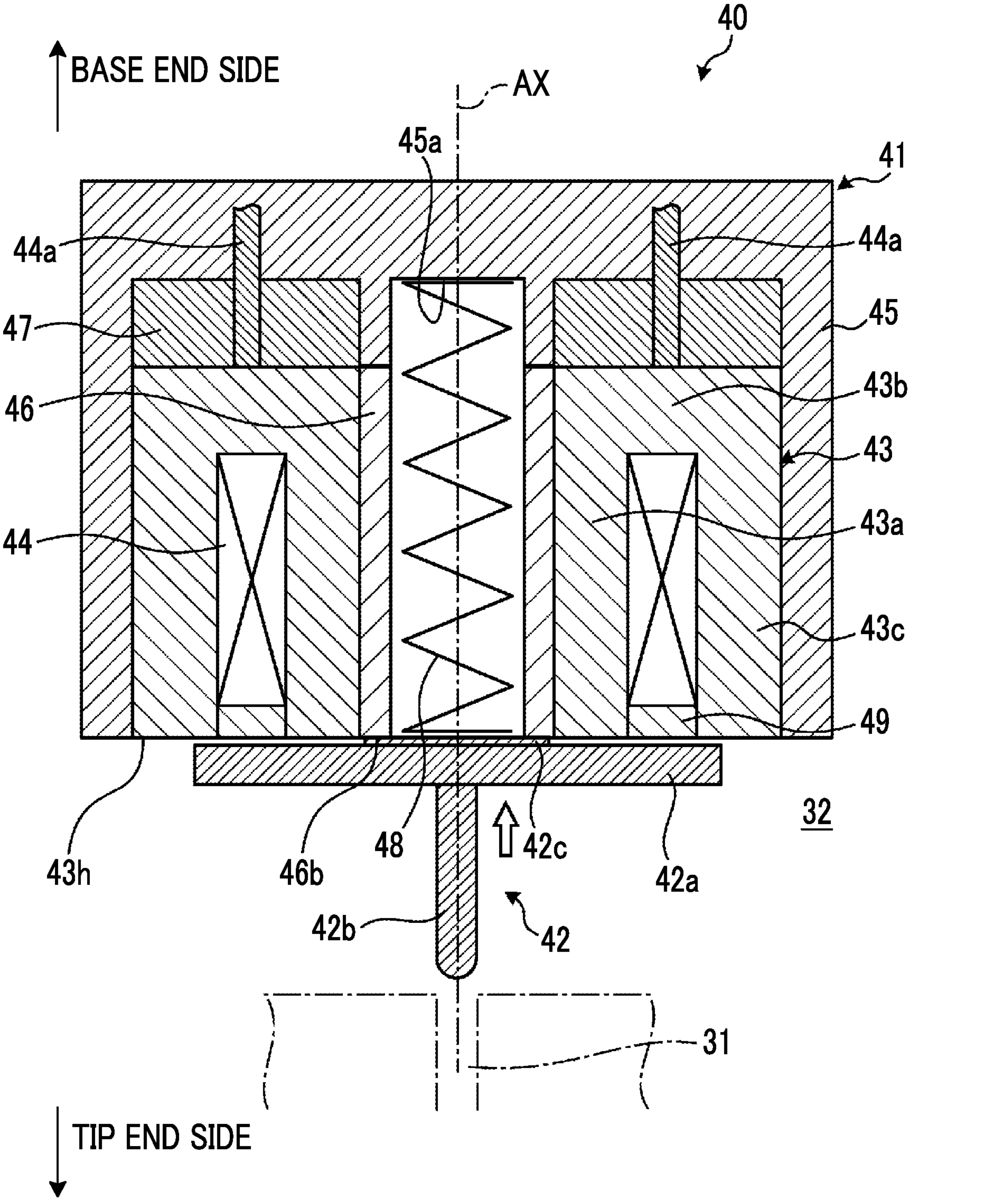
FIG. 7 is a vertical sectional view showing an example of the operation of the electromagnetic valve.

Further, in a case where a current flows through the coil 44 of the solenoid device 41, an electromagnetic force is generated in the solenoid device 41. FIG. 7 is a vertical sectional view showing an example of the operation of the electromagnetic valve 40. FIG. 7 shows an example in a case where a current flows through the coil 44. As shown in FIG. 7, in a case where an electromagnetic force is generated in the solenoid device 41, in the valve unit 42, the armature 42*a* is pulled toward the core 43 side by the electromagnetic force, and the valve body 42*b* is separated from the fuel discharge port 31. In this way, the fuel discharge port 31 becomes an open state.

The fuel discharge port 31 is opened, whereby the pressure in the control-side pressure chamber 28 is lowered. In a case where the resultant force of the pressure received from the control-side pressure chamber 28 and the elastic force of the elastic member 23 becomes smaller than the pressure received from the injection-side pressure chamber 27, the piston valve 22 moves toward the control-side pressure chamber 28 side. In this case, the valve body 22*d* of the piston valve 22 is separated from the fuel injection port 30 and the fuel injection port 30 becomes an open state. In a case where the fuel injection port 30 is in an open state, the fuel that has flowed from the fuel inlet port 24 into the injection-side pressure chamber 27 through the injection-side flow path 25 is injected from the fuel injection port 30.

In the above operation, in a case where the valve unit 42 is pulled toward the core 43 side by the electromagnetic force of the solenoid device 41, the stepped portion 42*c* of the valve unit 42 comes into contact with the end surface 46*b* of the tubular member 46, as shown in FIG. 7. In this case, the tubular member 46 functions as a stopper that restricts the movement of the valve unit 42 toward the base end side.

Further, in the above operation, the pressure in the control-side pressure chamber 28 changes depending on the supply pressure of the fuel that is supplied to the fuel inlet port 24 of the fuel injector 13. That is, the larger the supply pressure, the larger the pressure in the control-side pressure chamber 28 becomes, and the smaller the supply pressure, the smaller the pressure in the control-side pressure chamber 28 becomes. When the pressure in the control-side pressure chamber 28 is large, the force biasing the valve unit 42 toward the core 43 side becomes large. Further, when the pressure in the control-side pressure chamber 28 is small, the force biasing the valve unit 42 toward the core 43 side becomes small.

In a case where an electromagnetic force is not generated by the solenoid device 41, the elastic force from the elastic member 48 and the pressure in the control-side pressure chamber 28 act on the valve unit 42. The elastic member 48 is configured to apply an elastic force, which is larger than the received pressure that may be generated in the control-side pressure chamber 28, to the valve unit 42 so as to be able to maintain a state where the valve unit 42 closes the fuel discharge port 31 in this state.

In recent years, during the operation of the fuel injection device 10, it has been required to operate the fuel injection device 10 by increasing the maximum value of the supply pressure in the common rail 12, that is, to increase the pressure in the common rail 12. In a case where the pressure in the common rail 12 is increased, in order to prevent the fuel discharge port 31 from being opened due to the supply pressure, it is necessary to make the elastic force of the elastic member 48 that acts on the valve unit 42 large in response to the maximum value of the supply pressure.

On the other hand, in a case of operating the fuel injection device 10, there is a period during which the fuel injection device 10 is operated with the supply pressure lowered, for example. In a case where the supply pressure is low, the pressure in the control-side pressure chamber 28 becomes low. Since the elastic force of the elastic member 48 is set in response to the maximum value of the supply pressure, it is necessary to generate a larger electromagnetic force in order to separate the valve unit 42 from the fuel discharge port 31. That is, it is necessary to cause a larger current to flow through the coil 44.

In a case where a drive current having a large value flows through the coil 44 as described above, the amount of heat generated by the coil 44 increases, and a thermal load in the solenoid device 41 increases. In the solenoid device 41 that needs to generate such a large electromagnetic force, a separate cooling mechanism for cooling the solenoid device 41 is required.

On the contrary, in the fuel injection device 10 according to the present embodiment, by adjusting the drive current flowing through the coil 44 according to the supply pressure of the fuel that is supplied to the fuel inlet port 24, it is possible to suppress the amount of heat generated in the coil 44. The control unit 50 variably sets the value of the drive current flowing through the coil 44 in a predetermined period that includes the drive current supply start time point to, depending on the supply pressure of the fuel that is supplied to the fuel inlet port 24.

Figure 8:
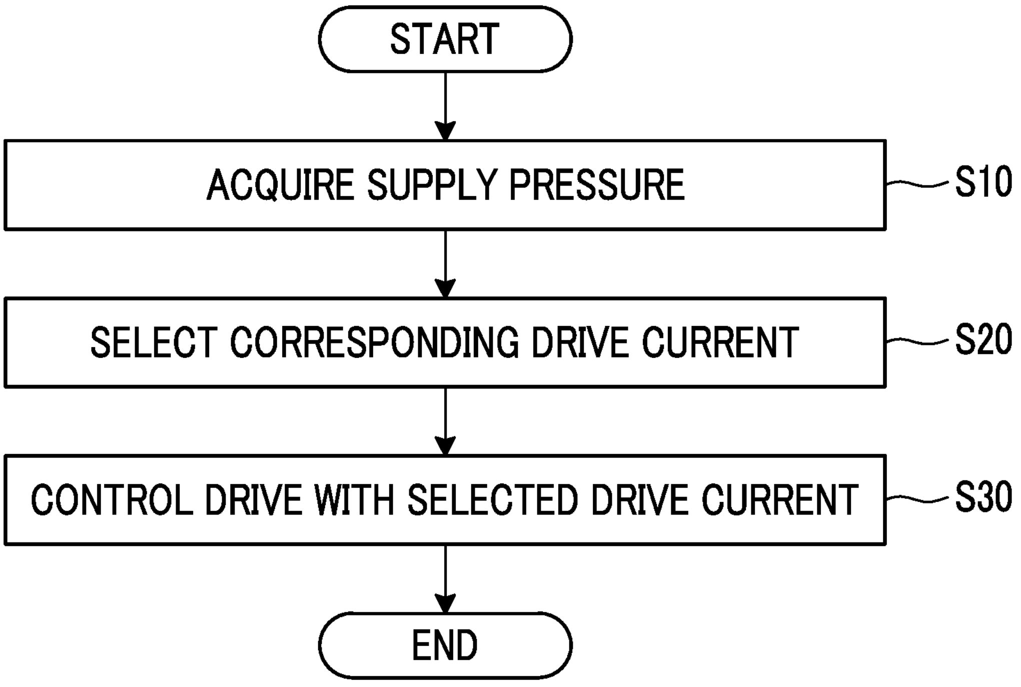
FIG. 8 is a flowchart showing an example of the operation of the fuel injection device according to the present embodiment.

FIG. 8 is a flowchart showing an example of the operation of the fuel injection device 10 according to the present embodiment. As shown in FIG. 8, the supply pressure acquisition unit 51 of the control unit 50 acquires the supply pressure of the fuel that is supplied to the fuel inlet port 24 (step S10). The supply pressure acquisition unit 51 acquires at least one of the detection result of the sensor 33 and the supply pressure that is extracted from the operation map of the ECU (not shown).

Next, the drive current control unit 52 selects the drive current I corresponding to the supply pressure from the data table stored in the storage unit 53, based on the acquired supply pressure (step S20). After the drive current I is selected, the drive current control unit 52 controls such that the selected drive current I flows through the coil 44 (step S30).

By this control, it is possible to cause the drive current to flow through the coil 44 such that the minimum electromagnetic force required for pulling the valve unit 42 toward the core 43 side is generated, depending on the supply pressure of the fuel that is supplied to the fuel inlet port 24. Therefore, the amount of heat generated in the coil 44 is reduced compared to a configuration of the related art in which a constant drive current is supplied regardless of the supply pressure.

As described above, the fuel injector 13 according to the present embodiment includes: the main body part 20 having the fuel inlet port 24 into which the fuel that is supplied from the fuel pump 11 flows, flow paths (the injection-side flow path 25 and the control-side flow path 26) through which the fuel that has flowed in from the fuel inlet port 24 flows, and the fuel discharge port 31 that is connected to the flow paths (25, 26) and discharges the fuel; the valve unit 42, at least a part of which is formed using a magnetic body, and which is disposed to be movable in a straight line direction between a position where the fuel discharge port 31 is closed and a position where the fuel discharge port 31 is opened, and is biased in a direction to open the fuel discharge port 31 by the pressure of the fuel flowing in from the fuel inlet port 24, the valve unit 42 being applied with an elastic force in a direction to close the fuel discharge port 31 by the elastic member 48; the solenoid device 41 that includes the coil 44, generates an electromagnetic force by causing a drive current to flow through the coil 44, and drives the valve unit 42 in the direction to open the fuel discharge port 31 by the electromagnetic force; and the control unit 50 that variably sets a value of the drive current flowing through the coil 44 in a predetermined period that includes a drive current supply start time point to, depending on the supply pressure of the fuel that is supplied to the fuel inlet port 24.

Further, a method for driving the fuel injector 13 according to the present embodiment is a method for driving a fuel injector which includes the main body part 20 having the fuel inlet port 24 into which fuel that is supplied from the fuel pump 11 flows, the injection-side flow path 25 and the control-side flow path 26, through which the fuel that has flowed in from the fuel inlet port 24 flows, and the fuel discharge port 31 that is connected to the injection-side flow path 25 and the control-side flow path 26 and injects the fuel, the valve unit 42 which is formed using a magnetic body, is disposed to be movable in a straight line direction between a position where the fuel discharge port 31 is closed and a position where the fuel discharge port 31 is opened, is biased in a direction to open the fuel discharge port 31 by the pressure of the fuel flowing in from the fuel inlet port 24, the valve unit 42 being applied with an elastic force in a direction to close the fuel discharge port 31 by the elastic member 48, and the solenoid device 41 that includes the coil 44, generates an electromagnetic force by causing a drive current to flow through the coil 44, and drives the valve unit 42 in the direction to open the fuel discharge port 31 by the electromagnetic force, the method including: a step of acquiring a supply pressure of the fuel that is supplied to the fuel inlet port 24; and a step of setting a value of the drive current flowing through the coil 44 in a predetermined period that includes a drive current supply start time point to, based on the supply pressure.

According to this configuration, it is possible to set the drive current that flows through the coil 44 such that the minimum electromagnetic force required for pulling the valve unit 42 toward the core 43 side is generated, depending on the supply pressure of the fuel that is supplied to the fuel inlet port 24. In this way, it becomes possible to suppress the amount of heat generated in the coil 44.

In the fuel injector 13 according to the present embodiment, the control unit 50 makes the value of the drive current in the predetermined period smaller as the supply pressure is higher, and makes the value of the drive current in the predetermined period larger as the supply pressure is lower. According to this configuration, it is possible to more reliably generate the minimum electromagnetic force required for pulling the valve unit 42 toward the core 43 side.

In the fuel injector 13 according to the present embodiment, the drive current includes the inrush current I1 that flows through the coil 44 during the inrush period t1, which is the first period that includes the supply start time point to in a time series, the pull-up current I2 that flows during the pull-up period t2 after the inrush current I1 has flowed, and the hold current I3 that flows during the hold period t3 after the pull-up current I2 has flowed, and the control unit 50 makes the values of the inrush current I1 and the pull-up current I2 smaller as the supply pressure is higher, and makes the values of the inrush current I1 and the pull-up current I2 larger as the supply pressure is lower. According to this configuration, it is possible to efficiently generate the minimum electromagnetic force required for pulling the valve unit 42 toward the core 43 side.

In the fuel injector 13 according to the present embodiment, the fuel injector 13 further includes the sensor 33 that detects the supply pressure, and the control unit 50 sets the value of the drive current in a predetermined period, based on the detection result of the sensor 33. According to this configuration, it is possible to flexibly set the value of the drive current according to the detection result of the sensor 33.

In the fuel injector 13 according to the present embodiment, the control unit 50 is capable of acquiring an operation map indicating the operation content of the fuel pump 11, extracts the supply pressure based on the acquired operation map, and sets the value of the drive current in a predetermined period, based on the extracted supply pressure. According to this configuration, by extracting the supply pressure, based on the operation map, it is possible to set the value of the drive current according to the operation situation.

In the fuel injector 13 according to the present embodiment, the fuel injector 13 further includes the storage unit 53 that stores a data table that defines the correspondence relationship between the supply pressure and the drive current, and the control unit 50 sets the drive current in a predetermined period corresponding to the supply pressure, based on the data table stored in the storage unit 53. According to this configuration, it is possible to efficiently set the drive voltage corresponding to the supply pressure.

The technical scope of the present invention is not limited to the above-mentioned embodiments, and can be appropriately changed without departing from the scope of the present invention. For example, in the embodiment described above, a configuration in which the electromagnetic valve 40 is provided in the fuel injector 13 of the fuel injection device 10 has been described as an example. However, the example is not limited thereto. The electromagnetic valve 40 may be provided at another portion of the fuel injection device 10.

Further, the embodiment of the fuel injection device 10 or the embodiment of the fuel pump 11 is not limited to the embodiment described above. For example, the number of common rails 12 or fuel injectors 13, the connection position of the fuel pump 11, and the like can be appropriately set.

Further, in the embodiment described above, a case where the inrush current I1 and the pull-up current I2 of the drive current I can be variably set has been described as an example. However, the example is not limited thereto. For example, the hold current I3 may be capable of being variably set. Further, only the inrush current I1 may be capable of being variably set.

REFERENCE SIGNS LIST

10: fuel injection device
11: fuel pump
12: common rail
13: fuel injector
14: fuel tank
20: main body part
21, 45: casing
22: piston valve
22*a*: spring seat member
22*b*: control-side piston member
22*c*: connecting member
22*d*, 42*b*: valve body
23, 48: elastic member
24: fuel inlet port
25: injection-side flow path
26: control-side flow path
27: injection-side pressure chamber
28: control-side pressure chamber
29: cylinder chamber
30: fuel injection port
31: fuel discharge port
32: electromagnetic valve-side pressure chamber
33: sensor
40: electromagnetic valve
41: solenoid device
42: valve unit
42*a*: armature
43: core
43*a*: tubular portion
43*b*: flange portion
43*c*: side surface portion
44: coil
44*a*: terminal
45*a*: supporting part
46: tubular member
46*b*: end surface
47: terminal fixing member
49: sealing part
50: control unit
51: supply pressure acquisition unit
52: drive current control unit
53: storage unit
AX: central axis
I, IA, IB: drive current
I1: inrush current
I2: pull-up current
I3: hold current
L11: fuel line
L12: fuel high-pressure line
L13: fuel supply line
t0: supply start time point
t1: inrush period
t2: pull-up period
t3: hold period

The invention claimed is:

1. A fuel injector comprising:

a main body part having an inflow port into which fuel that is supplied from a fuel supply source flows, a flow path through which the fuel that has flowed in from the inflow port flows, and a discharge port that is connected to the flow path and discharges the fuel;

a valve unit, at least a part of which is formed using a magnetic body, and which is disposed to be movable in a straight line direction between a position where the discharge port is closed and a position where the discharge port is opened, and is biased in a direction to open the discharge port by pressure of the fuel flowing in from the inflow port, the valve unit being applied with an elastic force in a direction to close the discharge port by an elastic member;

a solenoid device that includes a coil, generates an electromagnetic force by causing a drive current to flow through the coil, and drives the valve unit in the direction to open the discharge port by the electromagnetic force; and a control unit that variably sets a value of the drive current flowing through the coil in a predetermined period that includes a drive current supply start time point, depending on a supply pressure of the fuel that is supplied to the inflow port, wherein the control unit makes the value of the drive current in the predetermined period smaller as the supply pressure is higher, and makes the value of the drive current in the predetermined period larger as the supply pressure is lower, the drive current includes an inrush current that flows through the coil during an inrush period that is a first period that includes a supply start time point in a time series a pull-up current that flows during a pull-up period after the inrush current has flowed, and a hold current that flows during a hold period after the pull-up current has flowed, and the control unit makes values of the inrush current and the pull-up current smaller as the supply pressure is higher and makes the values of the inrush current and the pull-up current larger as the supply pressure is lower.

2. The fuel injector according to claim 1, further comprising:

a sensor that detects the supply pressure, wherein the control unit sets the value of the drive current in the predetermined period, based on a detection result of the sensor.

3. The fuel injector according to claim 1, wherein the control unit is capable of acquiring an operation map indicating an operation content of the fuel supply source, extracts the supply pressure based on the acquired operation map, and sets the value of the drive current in the predetermined period according to the extracted supply pressure.

4. The fuel injector according to claim 1, further comprising:

a storage unit that stores a data table defining a correspondence relationship between the supply pressure and the drive current, wherein the control unit sets the drive current in the predetermined period corresponding to the supply pressure, based on the data table stored in the storage unit.

5. A method for driving a fuel injector which includes a main body part having an inflow port into which fuel that is supplied from a fuel supply source flows, a flow path through which the fuel that has flowed in from the inflow port flows, and a discharge port that is connected to the flow path and discharges the fuel, a valve unit, at least a part of which is formed using a magnetic body, and which is disposed to be movable in a straight line direction between a position where the discharge port is closed and a position where the discharge port is opened, and is biased in a direction to open the discharge port by pressure of the fuel flowing in from the inflow port, the valve unit being applied with an elastic force in a direction to close the discharge port by an elastic member, and a solenoid device that includes a coil, generates an electromagnetic force by causing a drive current to flow through the coil, and drives the valve unit in the direction to open the discharge port by the electromagnetic force, the method comprising:

a step of acquiring a supply pressure of the fuel that is supplied to the inflow port; and a step of setting a value of the drive current flowing through the coil in a predetermined period that includes a drive current supply start time point, based on the supply pressure, wherein the step of setting makes the value of the drive current in the predetermined period smaller as the supply pressure is higher and makes the value of the drive current in the predetermined period larger as the supply pressure is lower, the drive current includes an inrush current that flows through the coil during an inrush period that is a first period that includes a supply start time point in a time series, a pull-up current that flows during a pull-up period after the inrush current has flowed, and a hold current that flows during a hold period after the pull-up current has flowed, and the step of setting makes values of the inrush current and the pull-up current smaller as the supply pressure is higher, and makes the values of the inrush current and the pull-up current larger as the supply pressure is lower.

6. The fuel injector according to claim 2, wherein the control unit is capable of acquiring an operation map indicating an operation content of the fuel supply source, extracts the supply pressure based on the acquired operation map, and sets the value of the drive current in the predetermined period according to the extracted supply pressure.

7. The fuel injector according to claim 2, further comprising:

a storage unit that stores a data table defining a correspondence relationship between the supply pressure and the drive current, wherein the control unit sets the drive current in the predetermined period corresponding to the supply pressure, based on the data table stored in the storage unit.

8. The fuel injector according to claim 3, further comprising:

a storage unit that stores a data table defining a correspondence relationship between the supply pressure and the drive current, wherein the control unit sets the drive current in the predetermined period corresponding to the supply pressure, based on the data table stored in the storage unit.

* * * * *